(12) United States Patent
Kats et al.

(10) Patent No.: US 8,873,460 B2
(45) Date of Patent: Oct. 28, 2014

(54) PACKET SNIFFER FOR AD HOC NETWORK

(75) Inventors: Marat Kats, Rockaway Beach, NY (US); Igor Tchibirev, Sea Cliff, NY (US)

(73) Assignee: Intech 21, Inc., Port Washington, NY (US)

( * ) Notice: Subject to any disclaimer, the term of this patent is extended or adjusted under 35 U.S.C. 154(b) by 547 days.

(21) Appl. No.: 12/596,095

(22) PCT Filed: Apr. 30, 2008

(86) PCT No.: PCT/US2008/062036
§ 371 (c)(1),
(2), (4) Date: Oct. 15, 2009

(87) PCT Pub. No.: WO2008/134732
PCT Pub. Date: Nov. 6, 2008

(65) Prior Publication Data
US 2010/0254310 A1 Oct. 7, 2010

Related U.S. Application Data

(60) Provisional application No. 60/914,953, filed on Apr. 30, 2007.

(51) Int. Cl.
*H04W 4/00* (2009.01)
*G06F 15/173* (2006.01)
*H04W 24/08* (2009.01)
*H04W 84/18* (2009.01)
*H04L 12/26* (2006.01)
*H04W 12/12* (2009.01)

(52) U.S. Cl.
CPC ............. *H04W 24/08* (2013.01); *H04W 84/18* (2013.01); *H04L 43/00* (2013.01); *H04W 12/12* (2013.01); *H04L 12/2602* (2013.01)
USPC ............ 370/328; 709/223; 709/224; 709/225

(58) Field of Classification Search
USPC ........................................................ 370/328
See application file for complete search history.

(56) References Cited

U.S. PATENT DOCUMENTS

| | | |
|---|---|---|
| 7,142,882 B2 | 11/2006 | Schmidt |
| 2002/0016838 A1 | 2/2002 | Geluc et al. |
| 2002/0031101 A1* | 3/2002 | Petite et al. ................... 370/310 |
| 2005/0099974 A1* | 5/2005 | Kats et al. ..................... 370/328 |
| 2005/0226195 A1 | 10/2005 | Paris et al. |
| 2006/0080566 A1 | 4/2006 | Sherburne, Jr. |
| 2006/0168207 A1* | 7/2006 | Choong et al. ................ 709/224 |
| 2006/0256798 A1 | 11/2006 | Quick et al. |
| 2007/0025313 A1* | 2/2007 | Bhagwat et al. .............. 370/338 |

* cited by examiner

*Primary Examiner* — Noel Beharry
(74) *Attorney, Agent, or Firm* — Brad M. Behar & Associates, PLLC

(57) ABSTRACT

A sniffer for an ad-hoc network including an RF transceiver for receiving network packets from the ad-hoc network, the RF transceiver being operable to receive the network packets without the sniffer being connected to the ad-hoc network; a microprocessor connected to the RF transceiver for processing the network packets to create associated FIFO packets; a memory connected to the microprocessor for storing the associated FIFO packets, and a communications interface for receiving the associated FIFO packets from the memory and for transmitting the associated FIFO packets to a computer.

10 Claims, 4 Drawing Sheets

PACKET SNIFFER FOR AD HOC NETWORK

FIELD OF THE INVENTION

The present invention relates to ad hoc networks and, in particular, to a packet sniffer for an ad hoc network.

BACKGROUND OF THE INVENTION

Standard IEEE 802.11 packet monitors (or sniffers) are known. Such monitors may, for example, monitor RF traffic packet traffic.

Traditionally, network nodes in an ad hoc network connect to and participate in data communication using the ad hoc network. However, with respect to at least some ad hoc networks, such as those manufactured by the assignee of the instant patent application, Intech21, there does not exist the ability to receive data packets in an ad hoc network without connecting to the network.

SUMMARY OF THE INVENTION

A packet sniffer is a radio frequency (RF) device that receives data packets transmitted by devices on an ad-hoc network, such as Intech21's radio frequency ad-hoc network. Much like a standard IEEE 802.11 RF packet monitor, the packet sniffer monitors "sniffs" the air, recognizing and receiving RF packets transmitted by a compatible ad-hoc network node or device. The sniffer may also act as a mobile access point with selective communication features that would enable it to receive packets only from nodes of an ad-hoc network having certain hierarchical levels.

The packet sniffer advantageously obtains data packets from the network passively, i.e., without having to connect to and participate in the ad-hoc network. The packet sniffer transfers the information contained in the received packets to a personal computer (PC) or other device through the sniffer's interface. The PC typically contains software tools that can analyze the data to monitor and troubleshoot the ad-hoc network.

DETAILED DESCRIPTION

Figure 1:
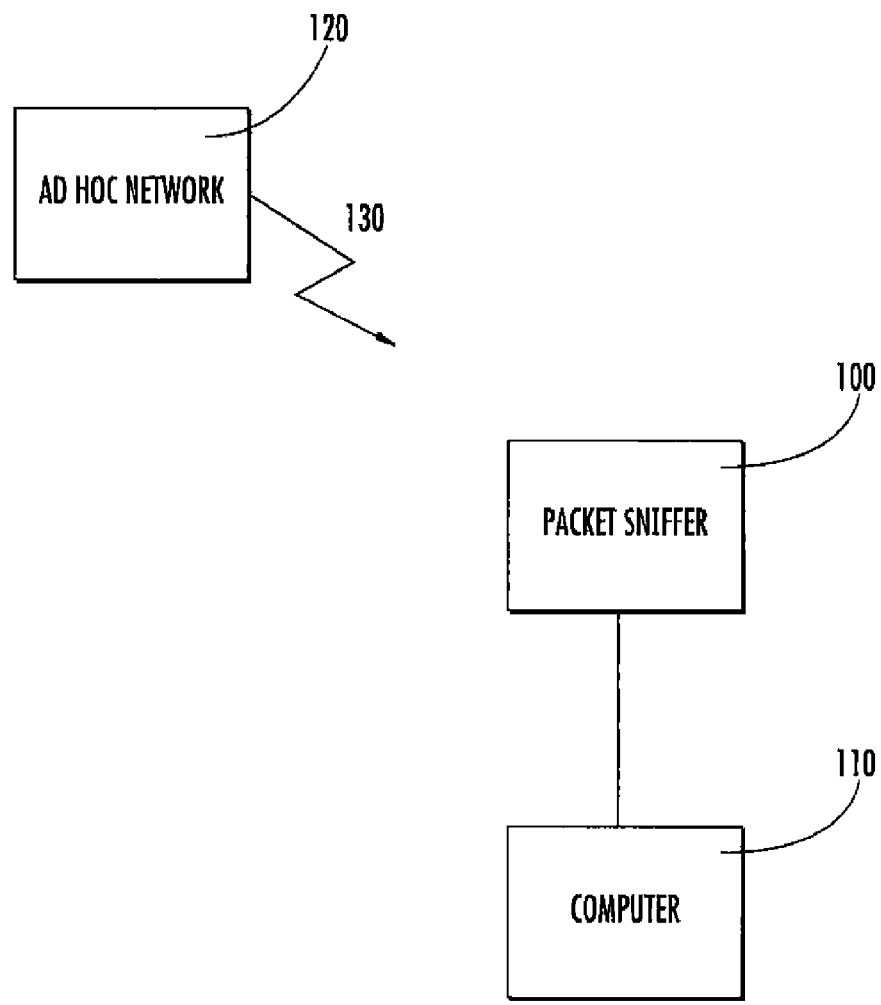
FIG. 1 is a block diagram of an ad-hoc network and sniffer in accordance with one embodiment of the present invention.

Referring to FIG. 1, there is seen a packet sniffer 100 coupled to a computer 110, such as a personal computer ("PC") 110. Packet sniffer 100 may be employed, for example, in an ad-hoc network 120. Packet sniffer 100 receives data packets wirelessly transmitted via an RF communication link 130 by one or more nodes in ad-hoc network 120, such as Intech21's radio frequency ad-hoc network. The packet sniffer 100 transfers the information contained in the received packets through an interface to computer 110, such as PC 110. The PC typically contains software tools that can analyze the data to monitor and troubleshoot the ad hoc network 300.

Figure 2:
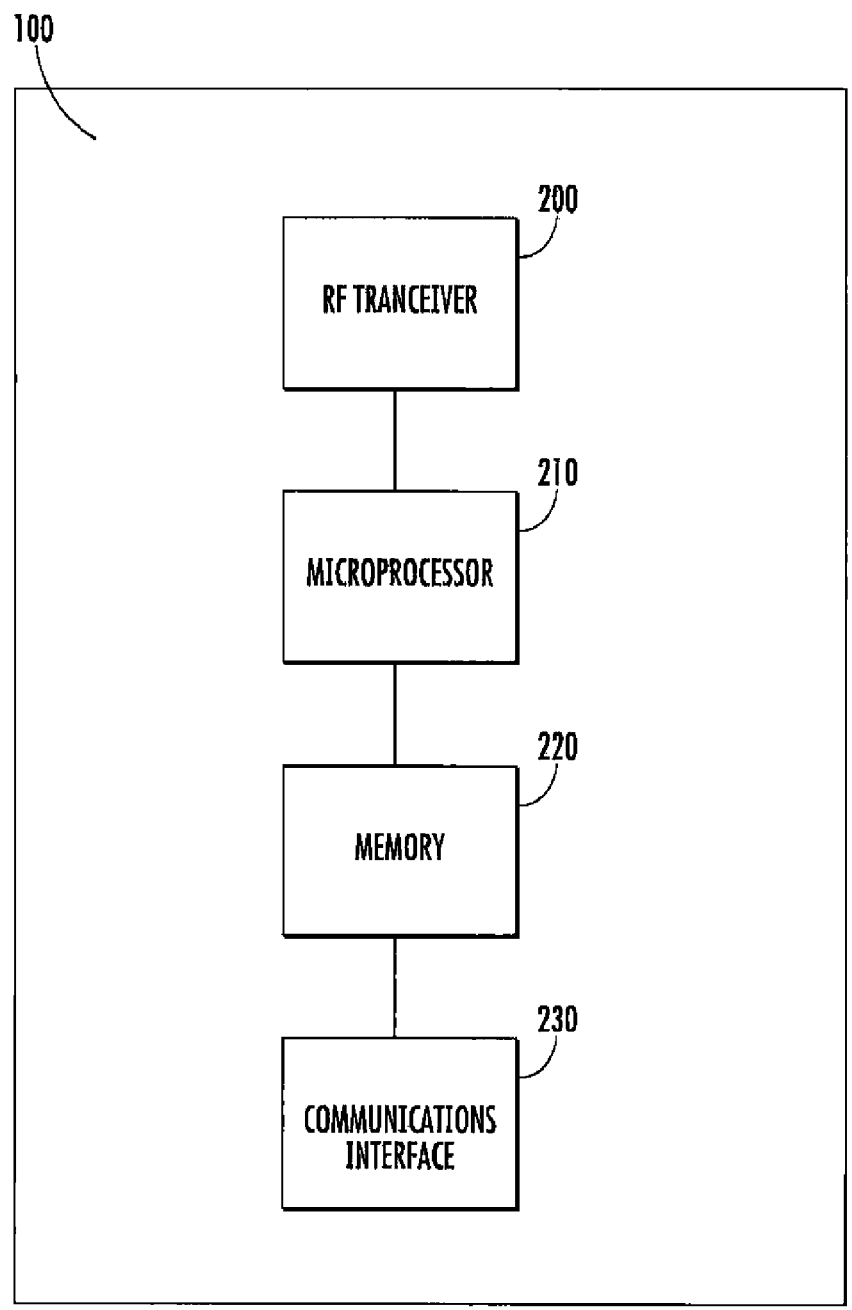
FIG. 2 is block diagram of an exemplary packet sniffer in accordance with one embodiment of the present invention.

Referring now to FIG. 2, there is seen an exemplary packet sniffer 100 in accordance with one embodiment of the present invention. Packet sniffer 100 includes microprocessor 210 coupled to RF transceiver 200, memory 220 coupled to microprocessor 210, and a communications interface 230 coupled to memory 220. In one embodiment, RF transceiver 200 is a TR1000 transceiver, which may be placed in a receive mode. Packet sniffer 100 also includes software, which may be copied from an external computer-readable medium (not shown) into memory 200, that, when executed, causes microprocessor 210 to receive radio frequency information from at least one ad-hoc network 120, select from the radio frequency information data packets originating from ad-hoc network 120, and transfer the data packets to communications interface 230 for transmission to an external device, such as computer 110.

As mentioned above, packet sniffer 100 receives RF packets from ad-hoc network 120. After some processing via microprocessor 210, data from the received packets are loaded into FIFO packets deposited into memory 220. This information is then transferred to communications interface 230 for communication to computer 110.

Communications interface 230 removes the information from memory 220 before transmitting it to the interfaced device, such as computer 110. Communications interface 230 may include, for example, an RS-232 serial channel device, but other communications interfaces are possible, such as RS-485, USE, PCMCIA, infrared, Ethernet and the like. Communications interface 230 transmits the information obtained from memory 220 to computer 110, such as PC 110. Software tools running on PC 110 use the information transmitted by packet sniffer 100 to create a variety of graphical, table, etc. and presentations of the surrounding RF ad-hoc network 120. These tools significantly simplify the installation, maintenance and troubleshooting of ad-hoc network 120.

Figure 3:
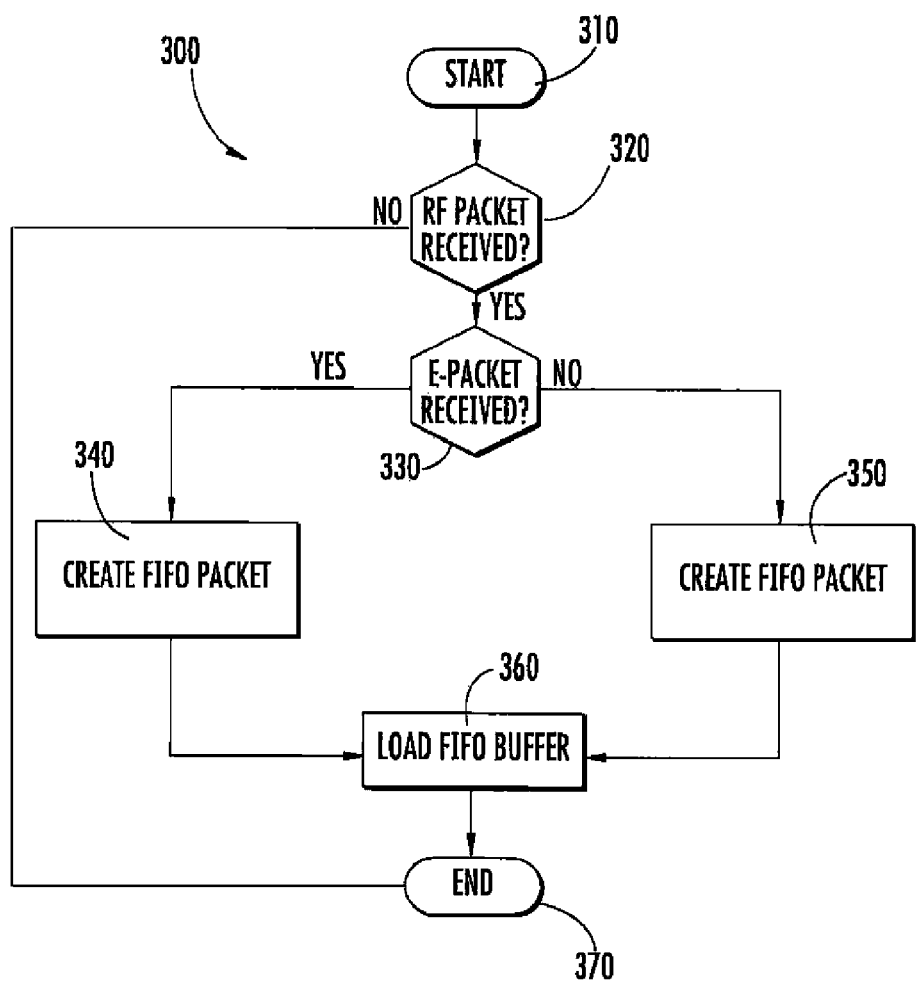
FIG. 3 is a flow diagram describing the functionality of a sniffer in accordance with one embodiment of the present invention.

Referring now to FIG. 3 there is seen an exemplary flow process 300 describing the functionality of packet sniffer 100. The process 300 begins at start step 310 and proceeds to step 320 where it is checked whether an RF packet has been received from ad-hoc network 120. If a packet is not detected and received, process 300 proceeds to end step 370. If decision step 320 detects an RF packet from ad-hoc network 120, process 300 proceeds to decision step 330 where it is determined whether the received RF packet is an "E" type packet or "E-Packet"—i.e., a packet containing status information of a network node of ad-hoc network 120. If the RF packet is not an E-packet, process 300 proceeds to step 350 where a FIFO packet is created in accordance with at least one field contained in the received RF packet, such as a packet type field, source ID field and/or data field. Sniffer 100 may also include within the FIFO packet information such as the radio signal strength of the received packet, the identifier of a node in ad-hoc network 120 to receive the packet, the identifier of the transmitting device or node, and the hierarchal level of the transmitting device or node. After the FIFO packet is created by step 350, process 300 proceeds to step 360, at which a FIFO buffer is loaded for transmission of the FIFO packets through communications interface 230 to a connected device, such as computer 110. Process 300 then ends at end step 370.

If it is determined in step 330 that the received RF packet is an E-Packet, process 300 proceeds to step 340 where sniffer 100 creates a FIFO packet. The FIFO packet created at step 340 may be (but need not be) similar to the one created at step 350, but may also include additional information, such as status information of a network node of ad-hoc network 120 that transmitted the E-packet to sniffer 100. This information may include, for example, an Received Signal Strength Indicator ("RSSI") measured for the received packet, the identification of the device or node of ad-hoc network 120 to receive the packet, the hierarchal level of the device or node of the ad-hoc network 120 that transmitted the E-packet, and/or the identification of the device or node of ad-hoc network 120 transmitting the E-packet.

Figure 4:
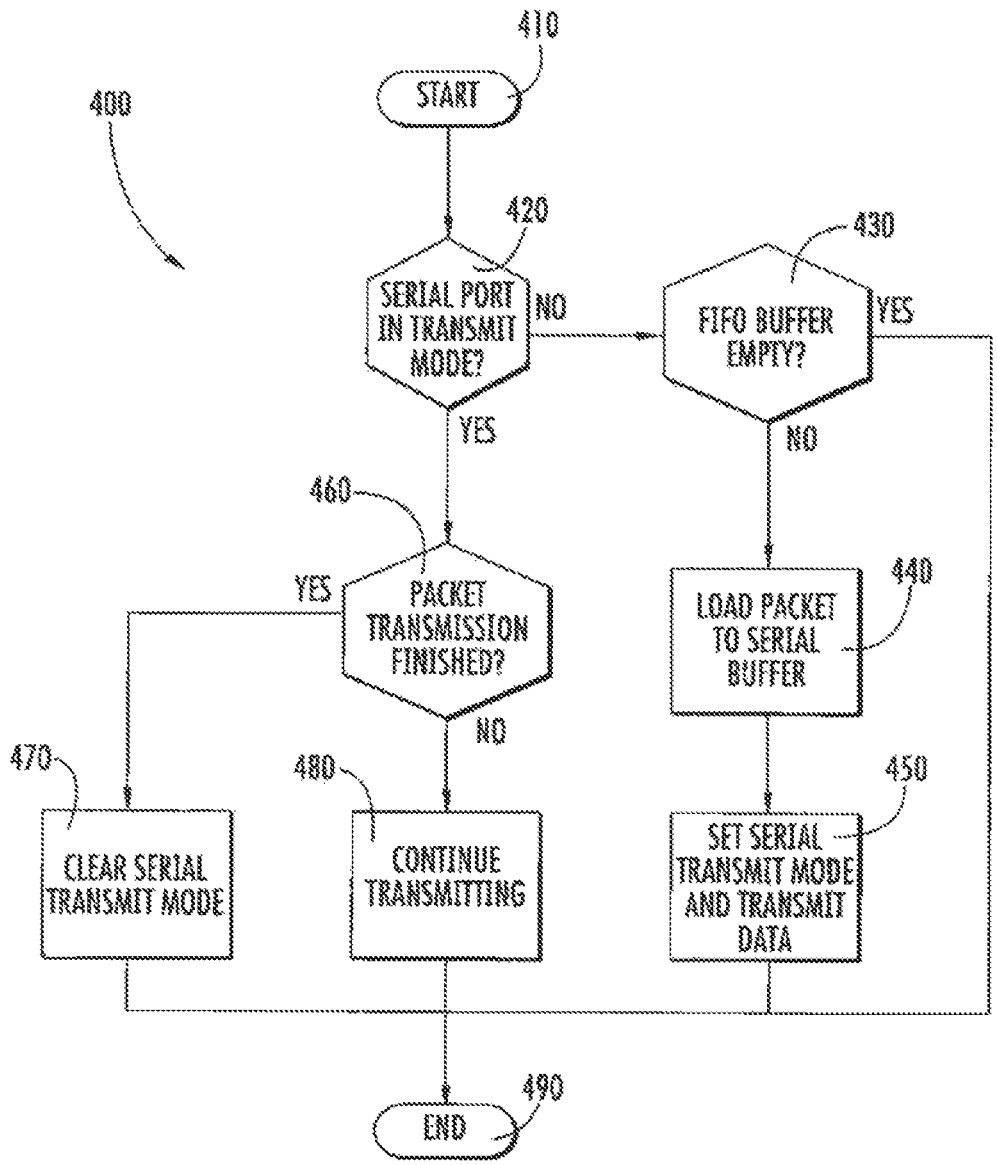
FIG. 4 is a flow diagram describing the transmission of FIFO packets in accordance with one embodiment of the present invention.

Referring now to FIG. 4, there is seen a flow process 400 for transmitting FIFO packets from the FIFO buffer of sniffer 100 to a connected computer 110 via communications interface 230. Flow process 400 may (but need not) follow completion of process 300 shown in FIG. 3.

Process 400 begins at start step 410 and proceeds to decision step 420 where it is determined whether a serial transmission port of sniffer 100 is in a transmit mode, i.e., whether it is in the process of transmitting a FIFO packet to a connected computer 110 via communications interface 230. If so, it is checked in step 460 whether the serial port is done transmitting the FIFO packet. If not, the serial port is allowed to continue transmitting the packet in step 480 and process 400 ends at end step 490. If it is determined in step 460 that the serial port is done transmitting the FIFO packet, the serial port is taken out of transmit mode in step 470 and process 400 ends at end step 490.

If it is determined in step 420 that the serial transmission port is not in a transmit mode, then it is checked in step 430 whether the FIFO buffer is empty. If so, process 400 proceeds to end step 490 and process 400 ends. If the FIFO buffer is not empty, the process proceeds to step 440 where a FIFO packet is loaded into the FIFO buffer. Then, process 400 proceeds to step 450 where the serial port is placed into transmit mode and transmission of the FIFO packet begins. Process 400 then proceeds to end step 490.

After end step 490, sniffer may begin process 300 once again, and both process 300 and 400 may be executed consecutively in an endless loop.

What is claimed is:

1. A sniffer for an ad-hoc network, comprising:
   an RF transceiver for receiving network packets from an ad-hoc network, the RF transceiver being operable to receive the network packets without the sniffer being connected to the ad-hoc network;
   a microprocessor connected to the RF transceiver for processing the network packets to create associated FIFO packets, said microprocessor determining if the network packets are from a specific ad hoc network and then determining if the network packets are E-packets containing status information of a network node from the specific ad hoc network before creating the FIFO packets;
   a memory connected to the microprocessor for storing the associated FIFO packets;
   a communications interface for receiving the associated FIFO packets from the memory and for transmitting the associated FIFO packets to a computer; and
   wherein at least one of the FIFO packets includes status information of the network node of ad-hoc network that transmitted the E-packet to the sniffer;
   wherein said status information includes a received signal strength indicator measured for the received packet at a network node, the identification of the network node of the ad-hoc network to receive the packet, an identifier of the hierarchal level of the network node that transmitted the E-packet, and the identification of the network node that transmitted the E-packet.

2. The sniffer of claim 1, wherein the RF transceiver is placed in a receive mode only.

3. The sniffer of claim 1, wherein the communications interface include at least one of an RS-232 serial channel device, an RS-485 interface, USB interface, a PCMCIA interface, an infrared interface, and an Ethernet interface.

4. The sniffer of claim 1, wherein each of the FIFO packets is created in accordance with at least one field of a network packet.

5. The sniffer of claim 4, wherein the at least one field includes at least one of a packet type field, a source ID field and a data field.

6. A sniffer for an ad-hoc network, comprising:
   an RF transceiver for receiving network packets from an ad-hoc network, the RF transceiver being operable to receive the network packets without the sniffer being connected to the ad-hoc network;
   a microprocessor connected to the RF transceiver for processing the network packets to create associated FIFO packets, said microprocessor determining if the network packets are from a specific ad hoc network and then determining if the network packets are E-packets containing status information of a network node from the specific ad hoc network before creating the FIFO packets;
   a memory connected to the microprocessor for storing the associated FIFO packets;
   a communications interface for receiving the associated FIFO packets from the memory and for transmitting the associated FIFO packets to a computer;
   wherein said status information in said E-packets comprise a received signal strength indicator measured for the received packet, the identification of the network node of the ad hoc network to receive the packet, an identifier of the hierarchal level of the network node that transmitted the E-packet, and the identification of the network node that transmitted the E-packet; and
   wherein at least one of the FIFO packets includes a received signal strength indicator measured for the received packet at a network node, the identification of the network node of the ad-hoc network to receive the packet, an identifier of the hierarchal level of the network node that transmitted the E-packet, and the identification of the network node that transmitted the E-packet.

7. The sniffer of claim 6, wherein the communications interface include at least one of an RS-232 serial channel device, an RS-485 interface, USB interface, a PCMCIA interface, an infrared interface, and an Ethernet interface.

8. The sniffer of claim 6, wherein each of the FIFO packets is created in accordance with at least one of a packet type field, a source ID field and a data field.

9. The sniffer of claim 6, wherein each of the FIFO packets created from an E-packet is created in accordance with a hierarchal level of the node of the ad-hoc network that transmitted the E-packet.

10. The sniffer of claim 9, wherein each of the FIFO packets created from network packets that are not E-packets is created in accordance with at least one of a packet type field, a source ID field and a data field.

* * * * *